Sept. 20, 1932.  A. E. JOHNSON  1,878,523
CLUTCH MECHANISM
Filed March 6, 1931
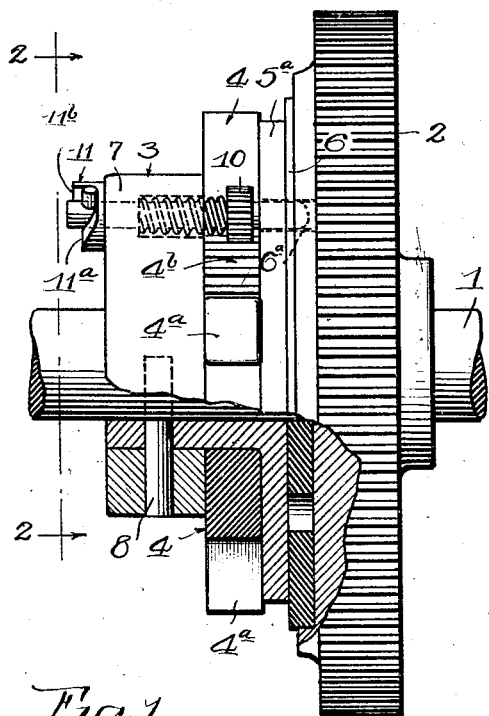
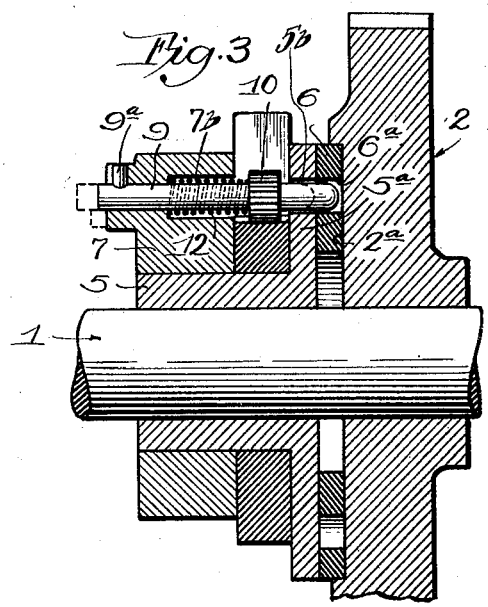
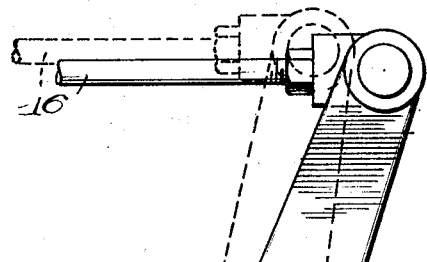
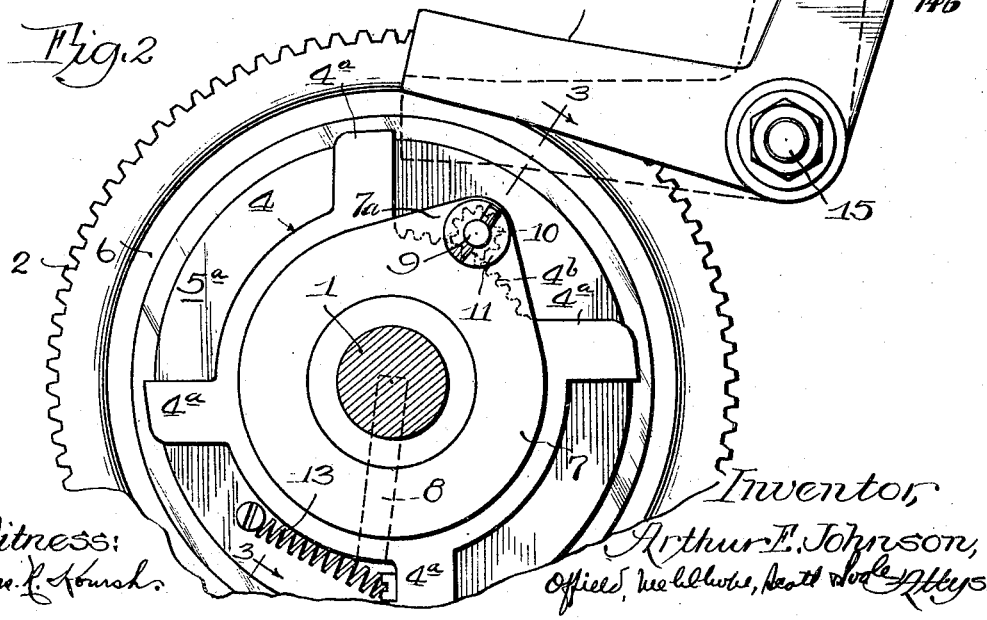

Patented Sept. 20, 1932

1,878,523

UNITED STATES PATENT OFFICE

ARTHUR E. JOHNSON, OF OAK PARK, ILLINOIS, ASSIGNOR TO WM. WRIGLEY JR. COMPANY, OF CHICAGO, ILLINOIS, A CORPORATION OF DELAWARE

CLUTCH MECHANISM

Application filed March 6, 1931. Serial No. 520,493.

This invention relates to improvements in clutch mechanism, and more particularly to a clutch applicable to automatic machines for temporarily interrupting the operation of certain parts or mechanisms or for disconnecting a driven member from a driver member or source of power.

A typical example of the application of a clutch mechanism of the present disclosure is one in which a driven shaft carries a loose gear wheel through which power is normally transmitted to drive said shaft and mechanism driven therefrom. The clutch is introduced between the shaft and the loose gear, so that the two normally rotate together, but under given conditions are disengaged, whereupon the gear wheel continues to rotate freely on the shaft, while the shaft comes to rest.

Such an arrangement is disclosed in the accompanying drawing, in which:

Figure 1 is a general view in side elevation of the clutch mechanism.

Figure 2 is an end view of the clutch as taken on line 2—2 of Figure 1, and

Figure 3 is a view in radial section as taken on line 3—3 of Figure 2.

Referring to Figure 1, the shaft 1 is assumed to be the driven shaft of any machine or mechanism, and the gear wheel 2 mounted thereon is the driving member having a loose connection with the shaft, but normally fixed thereto by the clutch mechanism consisting generally of relatively stationary clutch member 3 fixed to the shaft 1, and a relatively rotative clutch ring 4 having bearing on the clutch member 3 and identified by a set of four radial clutch teeth or abutments 4a spaced apart at equal intervals about its periphery.

As shown in Figure 3, the clutch member 3 consists of a sleeve 5 fitted onto the shaft adjacent the gear wheel 2 and having a radial flange 5a at one end which has contact with a hardened steel annular plate 6 of the same diameter which is fixed to the gear wheel 2, as by a press fit within a shallow annular cavity 2a in the face of said gear wheel. The clutch ring 4 has bearing on the sleeve 5 adjacent the flange 5a, and beyond the ring (to the left) is a heavy collar 7 which is fixed to the sleeve 5, and the sleeve to shaft 1 by a radial pin 8. With the exception, therefore, of the ring 4, the clutch assembly thus far described is fixed to the shaft and forms the member 3 made up of the flanged sleeve 5 and collar 7.

On the periphery of the clutch collar 4 and extending between two of the radial abutments 4a is a series of small gear teeth forming a gear sector 4b covering something less than one-quarter of the periphery.

As shown in Figure 2, the collar has a radial extension 7a of a tapered conformation extending beyond the toothed sector 4b and forming a bearing for a clutch pin 9 extending parallel with the shaft 1. In normal position, one end portion of the clutch pin extends across the toothed sector of the clutch collar 4 through an opening 5b in the flange 5a, and terminates in a rounded end projecting into one of two or more sockets 6a in the gear plate 6. Keyed to the clutch pin 9 is a small pinion 10 which meshes with the gear sector 4b of the clutch collar 4, the face of said pinion being considerably less in width than that of the collar.

On the outer face of the collar 7 of the fixed clutch member 3 is a small cylinder cam 11 which surrounds the outer or left hand extremity of the clutch pin 9, said cam having a laterally facing cam surface 11a sloping axially from end to end and terminating adjacent the base of the cam in an abutment or shoulder 11b. The clutch pin has a radial projection 9a which rides the cam face 11a, it being manifest that rotation of the pin in one direction is accompanied by its endwise shifting movement in a corresponding direction, and vice versa. In other words, if the pin 9 rotates in a clockwise direction as viewed from the outer or left end, the projection 9a rides against the sloping cam face 11a, shifting the pin endwise to the left, thus withdrawing the end 9 of the pin from the socket 6a in the plate 6, and disengaging the gear wheel 2 from the shaft 1 as shown in dotted lines in Figure 3.

Now, the endwise movement of the clutch pin 9 is opposed by a small coil spring 12 which surrounds the same between the pinion 10 and fixed clutch disc 3, the latter having a cavity 7b in its adjacent face of sufficient depth to receive the spring which acts to oppose the shifting of the clutch pin into disengaging position (to the left), but also acts in shifting the pin in the opposite direction and into clutch engaging position (to the right).

The rotation of the clutch pin is due to the relative rotation of the loose collar 4 and fixed clutch member 3 brought about by the introduction of a stop member into the path of one of the radial abutments 4a on the loose collar 4. Thus assuming that the shaft 1 is rotating in a clockwise direction, as viewed from the left in Figures 1 and 2, and a stop member (presently to be described) is shifted into the path of one of the abutments 4a on the collar 4, the latter will be locked against rotation and immediately the pinion 10 will begin to roll along the gear sector 4b, causing the projection 9a to travel along the cam face 11a and shift the pin 9 into clutch releasing position.

A coil spring 13 is attached at one end to the periphery of the clutch collar 4, and at its opposite end to the fixed disc 3 (Figure 2), said spring being so arranged as to oppose the relative rotation of said disc and collar in a direction to effect the release of the gear wheel 2 from the shaft 1, and to exert a tension on the collar to rotate it in the opposite direction when it is released by the stop member, and thus rotate the clutch pin 9 to shift it into position to engage the gear wheel 2.

The stop member which coacts with the loose collar 4 is shown as having the form of a bell-crank lever 14, journalled on a bearing 15 adjacent the clutch, so that the lever is free to rock in the plane of the loose clutch collar 4. One arm 14a of the lever projects toward the collar 4 somewhat tangentially so that a short swing of the lever drops the end of the arm into the path of one of the radial abutments 4a and the collar is locked against rotation, thus effecting the clutch-releasing action heretofore described. Similarly by rocking the lever arm out of contact with the abutment, the parts immediately function to resume clutch engaging position. Any suitable means or mechanism may be employed for actuating the lever 14 to operate the clutch, either automatic or manual in its action, the power in either case being transmitted through a rod 16 or equivalent means connected with the other or free arm 14b of the bell-crank lever 14.

Having set forth a preferred embodiment of my invention, I claim:

1. In a clutch mechanism, the combination with a driving and a driven member, one being loosely mounted on the other, of a collar fixed to one adjacent the other of said members, a clutch pin mounted in said collar for a combined rotative and endwise movement into and out of clutching engagement with said other member, a clutch ring rotatively mounted on said collar and having toothed engagement with said clutch pin, and means operative to hold said ring against rotation to thereby impart rotation to said clutch pin.

2. In a clutch mechanism, the combination of a rotative driving member, a driven member adapted to come to rest when disconnected from said driving member, a collar fixed to said driven member, a clutch pin journalled in said collar and having a pinion, a ring journalled on said collar and having a toothed sector meshing with said pinion, and means for imparting a relative rotation to said ring and collar whereby a limited rotation is imparted to said clutch pin and cam members acting to shift said clutch pin into and out of clutching engagement with said driving member in the rotation of said pin in opposite directions.

3. In a clutch mechanism, the combination with a driving and a driven member, one being loosely mounted on the other, of a collar fixed to one adjacent the other of said members, a clutch pin mounted in said collar for a combined rotative and endwise movement into and out of clutching engagement with said other member and provided with radial teeth, a clutch ring rotatively mounted on said collar and having a toothed sector meshing with the teeth of said clutch pin and a lever shiftable toward and from said clutch ring, the same having a radial abutment adapted to be engaged by said lever to hold said ring against rotation and thereby impart rotation to said clutch pin.

4. In a clutch mechanism, the combination of a driven shaft, a driving member loosely mounted on said shaft, a collar fixed to said shaft, a clutch pin mounted on said collar for endwise shifting movement into and out of engagement with said driving member and having a pinion mounted thereon, a clutch ring mounted to rotate on said collar and having a toothed sector meshing with the pinion on said clutch pin, and a clutch-releasing lever adapted to be shifted to and from said clutch ring, the latter having radial abutments projecting therefrom adapted to be engaged by said lever to lock said ring against rotation and thereby effect the shifting of said clutch pin into and out of clutching engagement with said driving member.

Signed at Chicago, Ill., this 30th day of January, 1931.

ARTHUR E. JOHNSON.